(12) United States Patent
Gu (10) Patent No.: US 10,789,508 B2
(45) Date of Patent: Sep. 29, 2020

(54) METHOD OF CONSTRUCTING A NEURAL NETWORK MODEL FOR SUPER DEEP CONFRONTATION LEARNING

(71) Applicant: Zecang Gu, Yokohama, Kanagawa (JP)

(72) Inventor: Zecang Gu, Kanagawa (JP)

(*) Notice: Subject to any disclaimer, the term of this patent is extended or adjusted under 35 U.S.C. 154(b) by 0 days.

(21) Appl. No.: 15/904,766

(22) Filed: Feb. 26, 2018

(65) Prior Publication Data

US 2018/0247159 A1    Aug. 30, 2018

(30) Foreign Application Priority Data

Feb. 27, 2017   (CN) .......................... 2017 1 0123105

(51) Int. Cl.
| | |
|---|---|
| G06K 9/62 | (2006.01) |
| G06N 3/08 | (2006.01) |
| G06N 3/04 | (2006.01) |
| G06K 9/46 | (2006.01) |
| G06K 9/22 | (2006.01) |
| G06K 9/00 | (2006.01) |

(52) U.S. Cl.
CPC ....... G06K 9/6251 (2013.01); G06K 9/00442 (2013.01); G06K 9/22 (2013.01); G06K 9/4652 (2013.01); G06K 9/6262 (2013.01); G06N 3/0436 (2013.01); G06N 3/0472 (2013.01); G06N 3/088 (2013.01)

(58) Field of Classification Search
CPC combination set(s) only.
See application file for complete search history.

(56) References Cited

U.S. PATENT DOCUMENTS

| | | | | |
|---|---|---|---|---|
| 5,544,257 A | * | 8/1996 | Bellegarda | G06K 9/6297 382/186 |
| 7,139,739 B2 | * | 11/2006 | Agrafiotis | G06N 3/02 706/20 |
| 2003/0065632 A1 | * | 4/2003 | Hubey | G06N 3/0436 706/15 |
| 2009/0097733 A1 | * | 4/2009 | Hero, III | G06K 9/6252 382/133 |
| 2014/0037172 A1 | * | 2/2014 | Madabhushi | G06K 9/6251 382/131 |
| 2018/0082189 A1 | * | 3/2018 | Cormier | G06F 21/6218 |
| 2018/0082208 A1 | * | 3/2018 | Cormier | G06F 11/3447 |

* cited by examiner

*Primary Examiner* — Tsung Yin Tsai
(74) *Attorney, Agent, or Firm* — Juan Carlos A. Marquez; Marquez IP Law, PLLC (57) ABSTRACT

In the current artificial intelligence field, models of deep learning that is prevalent can only map functions. Therefore, a machine learning model with higher performance is desirable. The issue is to construct a machine learning model that enables deep competitive learning between data based on the exact distance.
A precise distance scale is submitted by unifying Euclidean space and probability space.
It submits a measure of the probability measure of fuzzy event based on this distance. Or, it constructs a new neural network that can transmit information of the maximum probability. Furthermore, super deep competition learning is performed between data having very small ambiguous fuzzy information and minute unstable probability information. By performing integral calculation on this result, it has become possible to obtain dramatic effects at tape macro level.

2 Claims, 6 Drawing Sheets

METHOD OF CONSTRUCTING A NEURAL NETWORK MODEL FOR SUPER DEEP CONFRONTATION LEARNING

CROSS-REFERENCE TO RELATED APPLICATIONS

This application claims all benefits accruing under 35 U.S.C. § 119 from China Patent Application No. 201710123105.X, filed on Feb. 27, 2017 in the State Intellectual Property Office of China, the content of which is hereby incorporated by reference.

FIELD

The present disclosure relates to a super deep confrontation learning belonging to the field of information processing, in particular, a method of constructing a neural network model for super deep confrontation learning.

BACKGROUND

The success of Google investment and development of AlphaGo triumph over all human chess players has once again raised the world's upsurge of deep learning. In the past year, the number of patent applications related to artificial intelligence has also exceeded the total number of patents related to artificial intelligence.

The traditional neural network algorithm carries the information of the target function on the parameters of the mass weighted value through "training". In order to get the best solution in the learning process of the weighted value W and the threshold value T, the exhaustion method is needed. The total number of combinations is $\{(W*T)^n\}*P$. Here, n is the number of the nodes in the layer of the neural networks, and P is the number of layers in the neural network.

Computational complexity becomes $O(n^n)$ due to the enormous number of combinations, and it becomes a problem of NP-hard as shown in the above equation. Therefore, it is impossible to obtain the result of calculation using the current calculator.

Furthermore, since the weight value W of the conventional neural network model and the method of defining the threshold value T use only conventional mathematics, they are completely different from the principle of the brain trigger signal as a result. The nerve of the human brain revealed a totally different mechanism from the conventional neural network model.

Also, since the actual objective function originally belonged to the probability problem, the conventional neural network model can only have a mapping function, hence, it is necessary to rely on mass learning data. Since it is difficult to solve the probability problem, particularly at the time of choosing the weight value W and the threshold value T, an optimal solution is not obtained, thus leaving a black box problem.

The deep learning model, which is currently drawing attention, has basically not changed from the conventional neural network model. In fact, it is only to increase the number of hidden layers by a few hundred or more, using such a method, that there is doubt as to whether truly the processing ability can be deepened. We cannot theoretically prove that there is a relationship between the number of hidden layers and the processing capacity, due to the above reasons, as the result seems to only increase the computational complexity.

As a deep learning model, it cannot be expected to apply widely industrially.

Probability Space:

Based on the Soviet mathematician Andrey Kolmogorov, "probability theory is based on measure theory". The so-called probability space is a measurable space with a total measure of "1".

Probability Distribution:

The so-called probability distribution is based on the probability function, according to the size of the probability of its occurrence.

Probability Scale:

There must be a probability scale in any probability distribution in probability space, and the degree of probability distribution can be calibrated.

Probability Density

The integral value of the probability distribution function is in a given range.

Probability Measure of Fuzzy Event:

In the Euclidean space including the probability space S, if P (x) satisfies the additivity of the probability measure, the A (x) is a membership function and also satisfies the additivity of the fuzzy measure. The measure P (A) of the set A of the probability measure of the fuzzy event is as follows:

$$P(A) = \int_S \mu_A(x) p(x) dx \quad \text{(Formula 1)}$$

Its discrete expression formula is:

$$P(A) = \sum_{i=1}^{n} \mu_A(x_i) \, p(x_i) \quad \text{(Formula 2)}$$

Intelligent System:

An intelligent system is a system implemented based on a deterministic algorithm, a system that implements a kind of objective function according to a deterministic algorithm, and its processing results are deterministic systems.

Artificial Intelligence:

What is artificial intelligence? Simply speaking is to use a computer to realize the function of a person's mind, that is, the effect of a computer to realize the mind of a person. The outcome of the processing is often uncertain or unpredictable.

Clustering:

It non-autonomously the data set based on the Euclidean spatial scale within the range given in advance Self-organization:

Based on e scale of probability space, the self-discipline of data can be moved to the direction of high probability, and the unpredictable objective function can be obtained.

Machine Learning:

t is a model in which computers can autonomously acquire rules from data.

Self-Organizing Based on a Probability Scale

Let G be the set of probability distributions in the probability space and let $g_f$ be the data in the set:

$$g_f \in G (f=1, 2, \ldots, \zeta) \quad \text{(Formula 3)}$$

In the probability space, the probability distribution $g_f$ (f=1, 2, . . . , $\zeta$) must be a value of the feature A(G). Therefore, since the probability space is a measurement space, there always exists a probability scale M [G, A (G)] for the feature amount A (G). In order to meet the following probability scale self-organized conditions, the probability scale can be used as the benchmark to move the set $G^{(n)}$ towards the maximum probability direction:

$$A^{(n)}=A(G^{(n)})$$

$$M^{(n)}=M[G^{(n)},A(G^{(n)})]$$

$$G^{(n)}=G\{[A(G^{(n-1)}),M[G^{(n-1)},A(G^{(n-1)})]]\} \quad \text{(Formula 4)}$$

When n is larger than β (β is a value larger than 4), as a result of self-organization, the A ($G^{(n)}$) can be taken as maximum probability value, and the M[$G^{(n)}$, A ($G^{(n)}$)] can be taken as maximum probability scale for the central A($G^{(n)}$).

Maximum Probability:
It can surpass the result of traditional statistical prediction, that is, the most close to the prediction result of the mother.

Probability Space Distance:
In Euclidean space, $v_j \in V$ (j=1, 2, . . . , n) have a probability distribution in probability space, the probability distribution of the maximum probability scale is $M_j$. Let $r_j \in R$ be a elements of set R in Euclidean space, then the distance G from the R of the Euclidean space to the V of the probability space can be defined as follows:

$$G = \sqrt[2]{\sum_{j=1}^{n}(r_j - v_j)^2} \quad \text{(Formula 4)}$$

$$(r_j - v_j) = \begin{cases} 0 & |r_j - v_j| \leq M_j \\ |r_j - v_j| - M_j & |r_j - v_j| > M_j \end{cases}$$

Super Deep Learning:
A new neural network model consisting of the sensing layer, the nerve layer, and the cerebral cortex layer was constructed. Nodes between the input information and the sensing layer, the sensing layer and the nerve layer, and the cerebral cortex of the nerve layer, connected by unsupervised machine learning, probability information is transmitted.

SUMMARY

An aspect of the present disclosure includes a multi scale self organizing algorithm for probabilistic scales to construct an antagonistic learning model. To maximize the accuracy of image recognition and speech recognition, we can maximize the probability distribution information and fuzzy information by antagonistic learning model.

Aspects of the present disclosure also include a more rigorous definition of the strict distance between the Euclidean space and the probability space, a definition of the probability measure of a fuzzy event that can unify the Euclidean space and the probability space, a learning model of super deep regression analysis based on the self-organization of probability scale, a super-depth nonlinear manifold learning model of self-organized probability scale, and a learning model of super-depth and strong confrontation that can be authenticated by a public mobile phone.

Another embodiment of the present disclosure includes a method for constructing a neural network model of super deep confrontation learning. Technical solutions include:

Importing the distance that can unify the Euclidean space and probability space; or the probability measure of fuzzy event that can unify the Euclidean space and probability space; or transmits probability information between neural networks; or construction of a new neural network model uses a multiple probability scale self-organizing learning to compete learning.

(1) probability space exists in Euclidean space; or
(2) Its distance can unify Euclidean space and probability space; or
(3) To satisfy symmetry or triangular inequality in the scale of probability space distance; or
(4) The magnitude of the distance is related to the value of the probability distribution of the probability space.

(1) The recognition result is determined by the unified distance between Euclidean space and probability space, or a probability measure of fuzzy event that is unified with Euclidean space and probability space; or including the maximum probability reliability of the feature elements; on the basis of at least one measure; or
(2) Recognition result obtained by super deep competition learning among multiple data; or
(3) Between the sensing layer and the object of recognition; for positional deviation of recognition target, it can be tracked automatically using self-organization of multiple probability measures.

(1) The value of the probability measure of fuzzy events to the distance passing through two or more different spaces; or
(2) Obtained stable macro information using calculation of integration from micro ambiguity information and micro probability information; or
(3) When the starting point of the data is located at the position of the probability distribution of the end point, the result relates to the probability distribution value of that position.

(1) Self-organization processing of the maximum probability scale processing for distance values from all dots in the given range to straight line of the linear regression; or
(2) To generate a new processing range from the maximum probability scale on both side of the regression line based on the above processing result; or
(3) To determine whether the new processing range is to be expanded or reduced based on the actual dot density within the range, or based on the maximum probability scale.

(1) To obtain a probability distribution of a set of feature vectors of different colors of a printed image through super deep competition learning; or
(2) Self-organization based on the probability scale, the distance in which different spaces are unified for the relationship between the printed image of the label to be recognized and the data of the registered feature vector set of the registration, or the probability measure of fuzzy event, or including maximum probability reliability; Find at least one measure; or
(3) To create a forgery prevention verification code which gained recognition of truth or falsehood of cellular phone masses from a set of feature vectors of printed images of labels that identify different color spaces from mobile phones.

Another aspect of the present disclosure includes a neural network model that can reproduce the function of the brain with emphasis on the function of the human brain trigger with unchanged calculation complexity. When human cranial nerves are triggered by nerves, a method to accurately construct a new neural network model capable of matching the role of the neural threshold is desired. In addition, the ability of machine learning can go infinitely deep.

Yet another aspect of the present disclosure includes an artificial intelligence model which is fundamentally more advanced than the conventional deep learning model with low calculation complexity and high efficiency for application to actual industrialization.

DETAILED DESCRIPTION

A detailed description with the above drawing is made to further illustrate the present disclosure. As described below, embodiments of the present disclosure will be described in more detail with reference to the accompanying drawings, but embodiments of the present disclosure are illustrative and not limiting.

Figure 1:
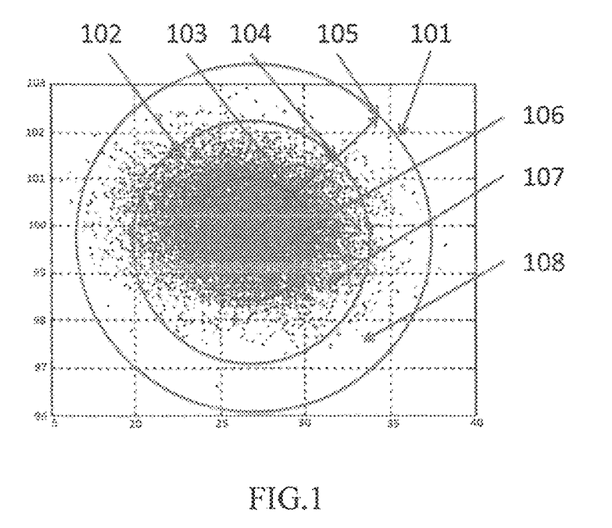
FIG. 1 is a schematic diagram of multiple probability scales defined by probability distribution model.

FIG. 1 is a schematic diagram of multiple probability scales defined by probability distribution model.
The scale of the probability distribution can be set by the value of the probability distribution. Here, the central value of the probability distribution is 102, the first scale value is 103, and the region between them is 106. Next, the second scale value is set to 104, and the area therebetween is 107. Assuming that the third scale value is 105 and the area therebetween is 108, the scale value of the probability distribution in a plurality of areas is called a multi-probability scale.

Another way to set the probability measure is after calculating the interval of the first scale value, the interval between the second and third scale values is set to make it the same as the interval of the first scale value, for example, the interval between (103) and (104) in FIG. 1 and the interval between (104) and (105) can be made the same as the interval between (102) and (103).

The probability scale is at least one of normal distribution, multivariate normal distribution, log normal distribution, exponential distribution, t distribution, F distribution, $X^2$ distribution, binomial distribution, negative binomial distribution, multinomial distribution and Poisson distribution. The probability of at least one probability distribution in Erlang distribution, Hyper geometric distribution, Geometric distribution, Traffic distribution, Weber distribution, Triangular distribution, Shell Betto distribution and Gamma distribution.

The correlation coefficient and the relative distance in the probability space can also be used as multiple probability scales.

For the non probability space as a probability scale may be extended to the Euclidean space distance scale, Manhattan distance scale, Chebyshev distance scale, Minkowski distance scale, Mahalanobis distance scale, Cosine distance scale, Wasserstein distance scale, Kullback-Leibler distance scale and Pearson distance scale.

Multi probability scale can be a scale of probability density, such as variance, mean variance or covariance of probability distribution. It can also directly calculate the density of data in one-dimensional space and two-dimensional space, so that it can also be a correlation value.

The distance from other spaces can also extend to multiple probability scales, for example, Jaccard similarity coefficient (Jaccardsimilarity Coefficient) scale, Hamming distance (Hamming Distance) scale and information entropy (Information Entropy) scale.

Some probabilistic algorithms such as Bayesian analysis, Gaussian Processes, or Gauss process and Bayesian analysis hybrid algorithm can constitute benchmark algorithm, etc., and extend to the definition of multi probability scale.

To give a brief introduction to technical features, there is no need to introduce the mathematical formula of probability scale in detail. As the data for all scales by using the method of mathematical model and construction machine learning model which all belong to the scope of the present invention.

Figure 2:
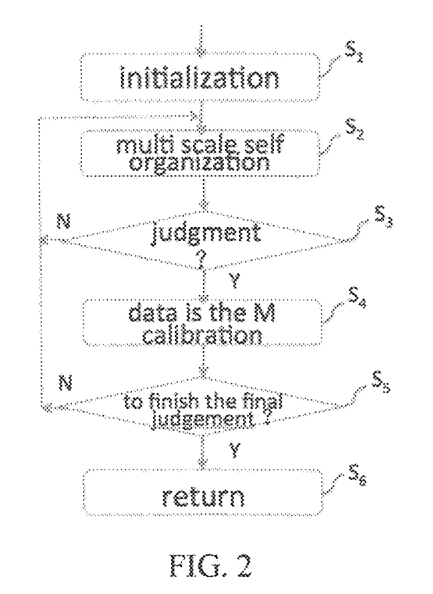
FIG. 2 is a self-organized machine learning flow chart with multiple probability scales.

FIG. 2 is a self-organized machine learning flow chart with multiple probability scales.

Here, according to the definition of the self organization of the above multi probability scale, as shown in FIG. 2, the processing flow of the self organized machine learning of multiple probabilistic scales is as follows:

St is an initialization step: In this step, it is the initialization procedure of multi probability scale self organizing machine learning program. In this step, we firstly input the objective function D (x, y), which can be one-dimensional data, also two-dimensional data and any dimension can be. The initial probability scale is set to $M^{(O)}$, and the initial center value is set to $(x_0, y_0)^{(O)}$. The self organization of multi probability scale can have two methods. The first method is self-organized from out of the probability distribution toward its center based on the multi probability scale. The second method is oppositely self-organized from the center of the probability distribution toward its outside.

The first method of the initialization of multi-probability scale self-organization:

The reason why multi scale $M^{(O)"}$ of the initialization probability is different from defined above $M^{(O)}$ of probability difference: $M^{(O)}$ only needs to give the estimation of the scale of the maximum, because it is a multi probability scale. We must firstly find the range of all probability distributions of the data, so we should give the estimation of the probability scale of all probability distributions. The probability range, that is, $M^{(O)"} > M^{(O)}$ generally is advisable about 3 times as much as possible.

The second methods of multiple probability scale self organizing initialization:

Here, it is assumed that $M^{(O)'} = M^{(O)}$ and it is not necessary to strictly set the MO) value, it can be artificially predicted, and the maximum probability scale $M^{(O)}$ as the radius value, the round region is set as the self-organized region by the maximum probability scale $M^{(O)}$ and the center value $(x_0, y_0)^{(O)}$. The maximum probability measure $M^{(O)}$ should contain a part of the final result $M^{(O)}$ by prediction, if $M^{(O)"}$ of the initialization probability scale is too large, the computation time will be longer, but conversely if it is too small, accurate results may not be obtained.

For other initialization settings, V is the convergent value of self-organization. The difference between the results of the previous organization and the results of this self organization is a determination condition whether the self-organized processing is completed or not. If convergence value V is too large, the correct results may not be obtained. If the convergence value V is too small, the need the processing time is too long. The correct setting is about 5-10% of the initial probability scale $M^{(n)}$. Please set the MN as the maximum number of self organized iterations. The maximum number of self-organization should be normally 5 to 10 times to prevent self organized iterations from being in an infinite dead cycle state. The setting of scale m of multi probability scale is m, and the scale number of multi probability scale is set. For example, there are three scales in the multiple probability scale which can calibrate the probability of three probability distribution regions, then M=3. As the number of times reflecting self-organization n=0 as the current initial number of self-organization.

$S_2$ is a multi scale self organization steps:

In this step, it is necessary to perform processing of its own organization of the m th probability scale n times, for the objective function D (x, y), $(x_0, y_0)_m^{n-1}$ as the center value of the self-organization, Based on the m-th probability measure $M_m^{(n-1)}$ as a radius, the center value $(x_0, y_0)_m^{(n-1)}$ and the radius $M_m^{(n-1)}$. The data $d_m^{(n)}(x_j, y_j)$ (i=1, 2, . . . , k; j=1, 2, . . . , l) of the new objective function was generated, and a new feature value $(x_0, y_0)_m^{(n-1)}$ and an m th new probability scale $M_m^{(n)}$ can always be found for new probability distribution data. Here, $d_m^{(n)} (x_j, y_j) \in D(x, y)$, n=n+1, MN=MN-1. In this step, processing is performed for each objective function data $d_m^{(n)} (x_j, y_j)$, it can gradually approach the direction of maximum probability.

$S_3$ is the judgment step of the processing completion: The calibration of the M probability scale self judgment step is completed. In this step, one out of $|M_m^{(n)} - M_m^{(n-1)}| \leq V$ or MN=0 is determined. If a condition is satisfied, the probability scale of the M scale process with multiple probability scales is completed. If we haven't completed the jump to the $S_2$ step, it is necessary to continue the operation of multi-probabilistic self-organization.

$S_4$ is the data storage step: After the completion of the self-organization processing based on the probability scale of m, the feature value of m scale $(x_n, y_n)_m^{(n)}$ and the m probability scale of $M_m^{(n)}$ are stored as the result of learning. m=m-1 is set, and the scale of the probability scale is corrected. Then, the multi probability scale $M_m^{(n)}$ and the feature value $(x_n, y_n)$ m are calculated. The new probability distribution is stored as follows.

$$D(x,y) \leftarrow dm^{(n)}(x_i, y_i)(i=1,2,\ldots,k; j=1,2,\ldots,l)$$

The multi probability scale is processed from the minimum scale for the self organization method based on the second probability scale. It is not necessary to process self-organization based on the multi probability scale if the next scale of probability scale is same as the value of the first maximum probability scale. The other scale intervals are set as the same interval of the first maximum probability scale. m=0 is set and, the next multi probability scale transferred to the final judgment step $S_5$.

$S_5$ is the final judgment step: This step is determining whether the processing of maximum probability scale is completed or not. In this step, if m is equal to 0, the self-organizing processing based on the multiple probability scale is finished, and it moves to S6. If no, it jumps to $S_2$ to continue self organizing processing of the next scale of multi probability scale.

$S_6$ is return step: This step is the final completion of the return to the main program.

Figure 3:
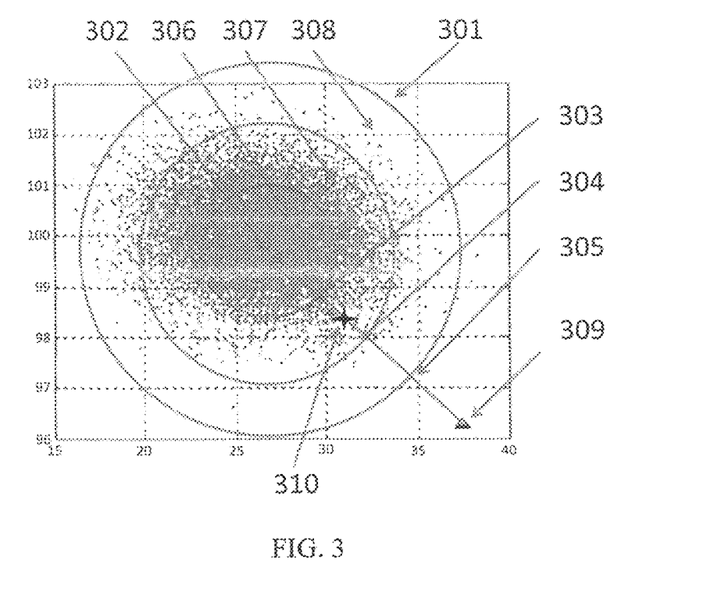
FIG. 3 is a definition between the unified Euclidean space and the probability space.

FIG. 3 is a definition between the unified Euclidean space and the probability space.

As shown in FIG. 3, 301 is a Euclidean space containing the probability space. 302 is a central point $w_j$ of the probability distribution in probability space. 303 is the first scale $M_1$ of the multiple probability scale of a probability distribution in probability space. 304 is the second scale $M_2$ of the probability distribution of a probability space with multiple probability scales. 305 is the third scale $M_3$ of the probability distribution of a probability space with multiple probability scales. 309 is a point $v_j$ of Euclidean space. Find the distance from set V to set W.

In actual pattern recognition, data of each feature value obtained are randomized under different conditions. By performing the iterative learning, it is possible to obtain the value of the probability distribution of the n feature values constituting the feature vector. Therefore, let one point 302 in the set W belonging to the probability space be $w_j \in W$ and one point 309 in the set V be $v_j \in V$. Also, when j=1, 2, . . . n is the number of feature values, for one feature value j, let $D_{1j}^{(wj)} = M_{2j} - M_{1j}$ be the interval between 302 and 303, let the probability distribution value in this area be $p_{1j}^{(wj)}$. Let $D_{2j}^{(wj)} = M_{3j} - M_{2j}$ be the interval between 303 and 304, and let the probability distribution value in this area be $p_{2j}^{(wj)}$. Let $D_{3j}^{(wj)} = M_{4j} - M_{3j}$ be the interval between 304 and 305, and let the probability distribution value in this area be $p_{3j}^{(wj)}$. As shown in FIG. 3, the number of scale becomes $m_j^{(wj)} = 3$ for the three scales of the probability distribution belonging to $w_j$ from V to W. From 309 to 302, the unified distance between Euclidean space and probability space can be defined as follows.

$$G(V, W) = \sqrt[2]{\sum_{j=1}^{n} (v_j - w_j)^2} \quad \text{(Formula 6)}$$

$$(v_j - w_j) = \begin{cases} 0 & |v_j - w_j| \leq \sum_{i=1}^{m_j^{(wj)}} D_{ij}^{(wj)} P_{ij}^{(wj)} \\ |v_j - w_j| - \sum_{i=1}^{m_j^{(wj)}} D_{ij}^{(wj)} P_{ij}^{(wj)} & |v_j - w_j| > \sum_{i=1}^{m_j^{(wj)}} D_{ij}^{(wj)} P_{ij}^{(wj)} \end{cases}$$

Here is the order, $$\Delta_j^{(wj)} = \sum_{i=1}^{m_j^{(wj)}} D_{ij}^{(wj)} P_{ij}^{(wj)}$$

$\Delta_j^{(wj)}$ in the above equation is an error value between distances of different spaces. Therefore, by correcting this error value, it is possible to obtain distances that unify different spaces. Here, the distance of different space is Euclidean distance and probability space distance in probability space. That is, in the probability space, it is the error between the distance value obtained by the Euclidean distance formula and the actual distance value of the probability space. If you understand the above concept, you can use $\Delta_j^{(wj)}$ as a correction value, by correcting it, it became possible to accurately obtain the distance at which Euclidean space and probability space are unified. It became possible to solve the scale problem between data belonging to both Euclidean space and probability space for machine learning.

If we assume that there is a point $r_j \in R$ belonging to set R in the interval from $v_j$ to $w_j$, the formula for expressing the ambiguous relationship between $r_j$ (310) and $w_j$ (302) is as follow: (Formula 7)

$$F_j^{(wj)} = \left[1 - \frac{(r_j - w_j)^2}{(v_j - w_j)^2}\right]$$

$$(r_j - w_j) = \begin{cases} 0 & |r_j - w_j| \leq \sum_{i=1}^{m_j^{(wj)}} D_{ij}^{(wj)} P_{ij}^{(wj)} \\ |r_j - w_j| - \sum_{i=1}^{m_j^{(wj)}} D_{ij}^{(wj)} P_{ij}^{(wj)} & |r_j - w_j| > \sum_{i=1}^{m_j^{(wj)}} D_{ij}^{(wj)} P_{ij}^{(wj)} \end{cases}$$

$$(v_j - w_j) = \begin{cases} 0 & |v_j - w_j| \leq \sum_{i=1}^{m_j^{(wj)}} D_{ij}^{(wj)} P_{ij}^{(wj)} \\ |v_j - w_j| - \sum_{i=1}^{m_j^{(wj)}} D_{ij}^{(wj)} P_{ij}^{(wj)} & |v_j - w_j| > \sum_{i=1}^{m_j^{(wj)}} D_{ij}^{(wj)} P_{ij}^{(wj)} \end{cases}$$

The formula is a membership function. When any point $r_j \in R$ in set R and $r_j \in R$ is close to $w_j \in W$, $F_j^{(wj)}$ the result is more close to the "1". Instead of $r_j \in R$ in R is away from $w_j \in W$. $F_j^{(wj)}$ is close to "0". The distance from here the formula 7 which can be seen by formula 6 is a leap in Euclidean space and probability space, so $F_j^{(wj)}$ is the fuzzy value spanning between Euclidean space and probability space.

The definition of the membership function is not the only way to define it. According to the method of human intervention, various formulae can be defined. Whatever the definition method, as long as it reflects the fuzzy relation between the two elements of objective function, it belongs to the scope of this invention.

Here, and then set up an arbitrary point $rj \in R$. If $rj \in R$ is right in a p area of the $D_{ij}^{(wj)}$ in probability distribution in $w_j \in W$, Let probability distribution value is $pf_j^{(wj)}$, in the region of $D_{pj}^{(wj)}$, and there is also a possibility, if the $v_j \in V$ is right in a q area of $D_{ij}^{(wj)}$, the probability distribution value is $ph_j^{(wj)}$ in the region of $D_{ij}^{(wj)}$. then the probability measures of fuzzy events $F^{(w)}$ of the set R to the set W is as follows:

$$F^{(w)} = \sum_{j=1}^{n} \left[ 1 - \frac{(r_j - w_j)^2}{(v_j - w_j)^2} \right] \quad \text{(Formula 8)}$$

$$(r_j - w_j) = \begin{cases} 0 & |r_j - w_j| \leq (1 + pf_j^{(wj)}) \sum_{i=1}^{m_j^{(wj)}} D_{ij}^{(wj)} P_{ij}^{(wj)} \\ |r_j - w_j| - (1 + pf_j^{(wj)}) \sum_{i=1}^{m_j^{(wj)}} D_{ij}^{(wj)} P_{ij}^{(wj)} & |r_j - w_j| > (1 + pf_j^{(wj)}) \sum_{i=1}^{m_j^{(wj)}} D_{ij}^{(wj)} P_{ij}^{(wj)} \end{cases}$$

$$(v_j - w_j) = \begin{cases} 0 & |v_j - w_j| \leq (1 + ph_j^{(wj)}) \sum_{i=1}^{m_j^{(wj)}} D_{ij}^{(wj)} P_{ij}^{(wj)} \\ |v_j - w_j| - (1 + ph_j^{(wj)}) \sum_{i=1}^{m_j^{(wj)}} D_{ij}^{(wj)} P_{ij}^{(wj)} & |v_j - w_j| > (1 + ph_j^{(wj)}) \sum_{i=1}^{m_j^{(wj)}} D_{ij}^{(wj)} P_{ij}^{(wj)} \end{cases}$$

In the definition as described above, it is possible to obtain considerably stable information on the macro level by integrating calculation using a trace amount of ambiguous information and a trace amount of unstable probability information. For the criterion in the strictest similarity relationship between R and W of the set, the role of fuzzy event probability measure $F^{(w)}$ is the optimal method for the theory of information processing. In the application of pattern recognition, it became possible to reflect the similarity relationship between two sets to the utmost, so that the feature vector set R and the dictionary data set W having registered probability distribution information are optimally collated.

It can be seen from formula 8 that when $r_j \in R$ and $v_j \in V$ are not in the probability distribution of $w_j \in W$. The probability distribution value is $pf_j^{(wj)}=0$ and $ph_j^{(wj)}=0$. Formula 8 is equal to the result of the integral formula 7 of the general distance between the space and probability space across Euclidean space.

The above Euclidean space can be extended to one of the following. Manhattan Space: (Manhattan Space), Pafunuti-Chebyshev Space, Minkowski Space, Mahalanobis Space, and Cosine Space.

When we compose two formal methods with Euclidean space and probability space distance unified by formulas 7 and 8, we found that each feature includes probability space in Euclidean space. When the data passes through the region of the probability space, the value of that distance is related to the probability distribution value of this region.

Also, the idea so far is that the distance measure of the probability space is related to the probability distribution value of the passing region. At the time of passing through the probability space, it needs to have a certain directionality and the not general distance scale. When calculating the distance from $v_j$ to $w_j$ that does not satisfy the condition of symmetry. For example, the distance of the probability space is the value of the probability distribution of $w_j$ in the process of passing from the position of $v_j$ to the position of $w_j$. Even if we have a probability distribution of $v_j$, it does not relate to the probability distribution value of $v_j$, which does not satisfy the symmetry of probability scale, triangle inequality. However, the present invention also provides a method which can satisfy all the conditions concerning the probability scale condition as follows.

Figure 4:
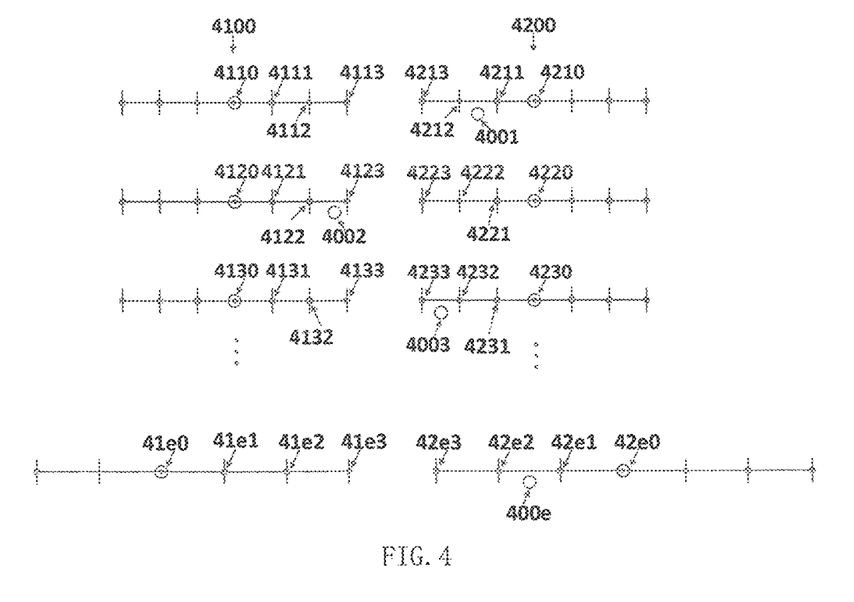
FIG. 4 is a schematic diagram of pattern recognition model for super deep confrontation learning.

FIG. 4 is a schematic diagram of a pattern recognition model for super deep confrontation learning.

In super deep competitive learning, as shown in FIG. 4: 4100 and 4200 which processed self-organization based on probability scale are set as two feature vector data f $fv_{1j} \in FV_1$ and $fv_{2j} \in FV_2$. Also, let 4000 be the feature element $sv_{1j} \in SV_1$ (j=1, 2, . . . , e) belonging to the feature vector SV. And let 4001 be $sv_1$, 4002 be $sv_2$, 4003 be $sv_3$, . . . , 400e be $sv_e$.

The feature vector data $F_{v1}$'s characteristic element $f_{v11}$'s first scale is 4111, $f_{v11}$'s second scale is 4112, $f_{v11}$'s third scale is 4113, and $f_{v11}$'s center value is 4110. The $f_{v12}$'s first scale is 4121, $f_{v12}$'s second scale is 4122, $f_{v12}$'s third scale is 4123, and $f_{v12}$'s center value is 4120. The $f_{v13}$'s first scale is 4131, $f_{v13}$'s second scale is 4132, $f_{v13}$'s third scale is 4133, and $f_{v13}$'s center value is 4130. The $f_{v1e}$'s first scale is 41e1, $f_{v1e}$'s second scale is 41e2, $f_{v1e}$'s third scale is 41e3, and $f_{v1e}$'s center value is 41e0.

The feature vector data $FV_2$'s characteristic element $fv_{21}$'s first scale is 4211, $fv_{21}$'s second scale is 4212, $fv_{21}$'s third scale is 4213, and $fv_{21}$'s center value is 4210. The $fv_{22}$'s first scale is 4221, $fv_{22}$'s second scale is 4222, $fv_{22}$'s third scale is 4223, and $fv_{22}$'s center value is 4220. The $fv_{23}$'s first scale is 4231, $fv_{23}$'s second scale is 4232, $fv_{23}$'s third scale is 4233, and $fv_{23}$'s center value is 4230. The $fv_{2e}$'s first scale is 42e1, $fv_{2e}$'s second scale is 42e2, $fv_{22}$es third scale is 42e3, and $fv_{2e}$'s center value is 42e0.

The feature element belonging to the characteristic vector SV of the identified object is $sv_j \in SV$. If $sv_j \in SV$ happens to be in the probability distribution area of the probability distribution area of the characteristic factor $fv_{2j}$ belonging to the characteristic vector data $FV_2$. The probability distribution value is $sf_j^{(fv2j)}$. The central value of the probability distribution of $fv_{1j}$ also happens to be in the $fv_{2j}$ probability distribution region with a probability distribution value of $sh_j^{(fv2j)}$. (This is a special case where the probability distribution of the $fv_{1j}$ is close to the probability distribution of the $fv_{2j}$).

Let $D_{ij}^{(fv2j)}$ be the graduation pitch of the probability distribution of the probability distribution of $fv_{2j}$ passing from the $sv_j \in SV$ to the center of the probability distribution of $fv_{2j}$. Assuming that the probability value of the probability distribution of $fv_{2j}$ in the interval of $D_{ij}^{(fv2j)}$ is $p_{ij}^{(fv2j)}$ (i=1, 2, ..., $m_j^{(fv2j)}$) and the number of probability scale measures is $m_j$.

The fuzzy event probability measure of the identified object vector SV and the eigenvector data $FV_2$ can be calculated according to formula 7 and formula 8.

In the same way, the feature element belonging to the characteristic vector SV of the identified object is $sv_j \in SV$. If $sv_j \in SV$ happens to be in the probability distribution area of the probability distribution area of the characteristic factor $fv_{1j}$ belonging to the characteristic vector data $FV_1$, the probability distribution value is $sf_j^{(fv1j)}$. The central value of the probability distribution of $fv_{1j}$ also happens to be in the $fv_{1j}$ probability distribution region with a probability distribution value of $sh_j^{(fv1j)}$. (This is a special case where the probability distribution of the $fv_{2j}$ is close to the probability distribution of the $fv_{1j}$).

Let $D_{ij}^{(fv1j)}$ be the graduation pitch of the probability distribution of the probability distribution of $fv_{1j}$ passing from the $sv_j \in SV$ to the center of the probability distribution of $fv_{1j}$. Let $m_j^{(fv1j)}$ be the number of probability scale measures and let $P_{ij}^{(fv1j)}$ (i=1, 2, ..., $m_j^{(fv1j)}$) be the probability value of the probability distribution of $fv_{1j}$ in the region of $D_{ij}^{(fv1j)}$.

The feature vector SV to be recognized and the probability measure of fuzzy event for the registered feature vector data FV1 are as follows:

$$F^{(FV2)} = \sum_{j=1}^{e} \left[ 1 - \frac{(SV_j - fv_{2j})^2}{(fv_{1j} - fv_{2j})^2} \right] \quad \text{(Formula 9)}$$

$$(SV_j - fv_{2j}) = \begin{cases} 0 & |SV_j - fv_{2j}| \leq \left(1 + Sf_j^{(fv2j)}\right) \sum_{i=1}^{m_j^{(fv2j)}} D_{ij}^{(fv2j)} P_{ij}^{(fv2j)} \\ |SV_j - fv_{2j}| - \left(1 + sf_j^{(fv2j)}\right) \sum_{i=1}^{m_j^{(fv2j)}} D_{ij}^{(fv2j)} P_{ij}^{(fv2j)} & |SV_j - fv_{2j}| > \left(1 + Sf_j^{(fv2j)}\right) \sum_{i=1}^{m_j^{(fv2j)}} D_{ij}^{(fv2j)} P_{ij}^{(fv2j)} \end{cases}$$

$$(fv_{1j} - fv_{2j}) = \begin{cases} 0 & |fv_{1j} - fv_{2j}| \leq \left(1 + Sh_j^{(fv2j)}\right) \sum_{i=1}^{m_j^{(fv2j)}} D_{ij}^{(fv2j)} P_{ij}^{(fv2j)} \\ |fv_{1j} - fv_{2j}| - \left(1 + Sh_j^{(fv2j)}\right) \sum_{i=1}^{m_j^{(fv2j)}} D_{ij}^{(fv2j)} P_{ij}^{(fv2j)} & |fv_{1j} - fv_{2j}| > \left(1 + Sh_j^{(fv2j)}\right) \sum_{i=1}^{m_j^{(fv2j)}} D_{ij}^{(fv2j)} P_{ij}^{(fv2j)} \end{cases}$$

$$F^{(FV1)} = \sum_{j=1}^{e} \left[ 1 - \frac{(SV_j - fv_{1j})^2}{(fv_{2j} - fv_{1j})^2} \right] \quad \text{(Formula 10)}$$

$$(SV_j - fv_{1j}) = \begin{cases} 0 & |SV_j - fv_{1j}| \leq \left(1 + Sp_j^{(fv1j)}\right) \sum_{i=1}^{m_j^{(fv1j)}} D_{ij}^{(fv1j)} P_{ij}^{(fv1j)} \\ |SV_j - fv_{1j}| - \left(1 + Sp_j^{(fv1j)}\right) \sum_{i=1}^{m_j^{(fv1j)}} D_{ij}^{(fv1j)} P_{ij}^{(fv1j)} & |SV_j - fv_{1j}| > \left(1 + Sp_j^{(fv1j)}\right) \sum_{i=1}^{m_j^{(fv1j)}} D_{ij}^{(fv1j)} P_{ij}^{(fv1j)} \end{cases}$$

-continued $$(fv_{2j} - fv_{1j}) = \begin{cases} 0 & |fv_{2j} - fv_{1j}| \leq \left(1 + Sh_j^{(fv1,j)}\right) \sum_{i=1}^{m_j^{(fv1,j)}} D_{ij}^{(fv1,j)} P_{ij}^{(fv1,j)} \\ |fv_{2j} - fv_{1j}| - \left(1 + Sh_j^{(fv1,j)}\right) \sum_{i=1}^{m_j^{(fv1,j)}} D_{ij}^{(fv1,j)} P_{ij}^{(fv1,j)} & |fv_{2j} - fv_{1j}| > \left(1 + Sh_j^{(fv1,j)}\right) \sum_{i=1}^{m_j^{(fv1,j)}} D_{ij}^{(fv1,j)} P_{ij}^{(fv1,j)} \end{cases}$$

The formula for conflicting the feature vector SV to be identified with the registered feature vector data $FV_2$ and $FV_1$ is as follows:

$$F = F^{(FV2)} / F^{(FV1)} \quad \text{(Formula 11)}$$

Or $$F = \frac{1}{e} \sum_{j=1}^{e} \left\{ 1 - \frac{(SV_j - fv_{2j})^2}{(SV_j - fv_j)^2} \right\}$$

$$(SV_j - fv_{2j}) = \begin{cases} 0 & |SV_j - fv_{2j}| \leq \left(1 + Sf_j^{(fv2,j)}\right) \sum_{i=1}^{m_j^{(fv2,j)}} D_{ij}^{(fv2,j)} P_{ij}^{(fv2,j)} \\ |SV_j - fv_{2j}| - \left(1 + Sf_j^{(fv2,j)}\right) \sum_{i=1}^{m_j^{(fv2,j)}} D_{ij}^{(fv2,j)} P_{ij}^{(fv2,j)} & |SV_j - fv_{2j}| > \left(1 + Sf_j^{(fv2,j)}\right) \sum_{i=1}^{m_j^{(fv2,j)}} D_{ij}^{(fv2,j)} P_{ij}^{(fv2,j)} \end{cases}$$

$$(SV_j - fv_{1j}) = \begin{cases} 0 & |SV_j - fv_{1j}| - \left(1 + Sh_j^{(fv1,j)}\right) \sum_{i=1}^{m_j^{(fv1,j)}} D_{ij}^{(fv1,j)} P_{ij}^{(fv1,j)} \\ |SV_j - fv_{1j}| - \left(1 + Sh_j^{(fv1,j)}\right) \sum_{i=1}^{m_j^{(fv1,j)}} D_{ij}^{(fv1,j)} P_{ij}^{(fv1,j)} & |SV_j - fv_{1j}| - \left(1 + Sh_j^{(fv1,j)}\right) \sum_{i=1}^{m_j^{(fv1,j)}} D_{ij}^{(fv1,j)} P_{ij}^{(fv1,j)} \end{cases}$$

Here, when F>1, the feature vector SV to be identified belongs to the feature vector data $FV_2$. Conversely, when F<1, the feature vector SV to be identified belongs to the feature vector data $FV_1$.

Figure 5:
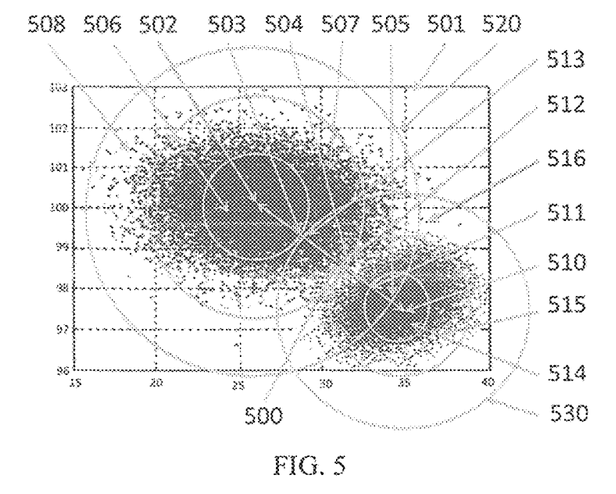
FIG. 5 is a schematic diagram of the best classification model for super deep confrontation learning.

FIG. 5 is a schematic diagram of the best classification model for super deep confrontation learning.

As shown in FIG. 5, 501 is a Euclidean spatial sketch map that covers the probability space. In 501 Euclidean space, there are two probability distributions of probability 520 and 530 in the probability space. 502 is the central value of the probability distribution 520, and 503 is the first scale of the probability distribution 520. 504 is the second scale of the probability distribution 520. 505 is the third scale of the probability distribution 520. 506 is the first scale area of the probability distribution 520, and the probability value is $p_{ij}^{(520)}$.

507 is the second scale area of the probability distribution 520, and the probability value is $p_{2j}^{(520)}$. 508 is the third scale area of the probability distribution 520, and the probability value is $p_{3j}^{(520)}$.

510 is the central value of the probability distribution 530. 511 is the first scale of the probability distribution 530. 512 is the second scale of the probability distribution 530. 513 is the third scale of the probability distribution 530. 514 is the first scale area of the probability distribution 530, and the probability value is $p_{ij}^{(530)}$. 515 is the second scale area of the probability distribution 530, and the probability value is $p_{2j}^{(530)}$. 516 is the third scale area of the probability distribution 530, and its probability value is $p_{3j}^{(530)}$.

A model of super deep confrontation learning is: Euclidean space is 501 in the Euclidean space 501. There is a two probability distribution of 520 and 530. The two probability distribution center are elements $w_j \in W$ set of W and elements $v_j \in V$ set of V with two probability distribution of the midpoint of 502 and 510 connected in a straight line. A projection of this line is a point 500. It can be represented by $r_j \in R$ to find any point $r_j \in R$ of 500 that belongs to that the probability distribution.

Here, let $m_j^{(wj)}$ be $r_j$ to reach the number of probability regions involved by the multiple probability scale between the centers of $w_j$ probability distribution. For example, FIG. 5 is $m_j^{(wj)} = 2$, then set $p_{ij}^{(520)} = p_{ij}^{(wj)}$, (i=1, 2, ..., $m_j^{(wj)}$), the expression formula of exact distance in which the Euclidean space and the probability space are unified between the set V belonging to the probability space 530 and the set W belonging to the probability space 520 by the formula 6 is as follows.

$$G(V, W) = \left\{ \sqrt[2]{\sum_{j=1}^{n} (r_j - v_j)^2} \right\} + \left\{ \sqrt[2]{\sum_{j=1}^{n} (r_j - w_j)^2} \right\} = \quad \text{(formula 12)}$$

$$\left\{ \sqrt[2]{\sum_{j=1}^{n} (v_j - w_j)^2} \right\} = \left\{ \sqrt[2]{\sum_{j=1}^{n} (w_j - v_j)^2} \right\}$$

And, $$(r_j - v_j) = \begin{cases} 0 & |r_j - v_j| \leq \Delta_j^{(vj)} \\ |r_j - v_j| - \Delta_j^{(vj)} & |r_j - v_j| > \Delta_j^{(vj)} \end{cases}$$

-continued $$(r_j - w_j) = \begin{cases} 0 & |r_j - w_j| \le \Delta_j^{(wj)} \\ |r_j - w_j| - \Delta_j^{(wj)} & |r_j - w_j| > \Delta_j^{(wj)} \end{cases}$$

$$(v_j - w_j) = (w_j - v_j) =$$
$$\begin{cases} 0 & |v_j - w_j| \le (\Delta_j^{(vj)} + \Delta_j^{(wj)}) \\ |v_j - w_j| - (\Delta_j^{(vj)} + \Delta_j^{(wj)}) & |v_j - w_j| > (\Delta_j^{(vj)} + \Delta_j^{(wj)}) \end{cases}$$

Here, $$\Delta_j^{(vj)} = \sum_{i=1}^{m_j^{(vj)}} D_{ij}^{(vj)} P_{ij}^{(vj)}$$

and, $$\Delta_j^{(wj)} = \sum_{i=1}^{m_j^{(wj)}} D_{ij}^{(wj)} P_{ij}^{(wj)}$$

Here, based on the distance from $r_j$ to the center $w_j$ of the probability distribution and the distance from $r_j$ to the center $v_j$ of the probability distribution, for the distance from the center $v_j$ of the probability distribution 530 to the center $w_j$ of the probability distribution 520, $(\Delta_j^{(vj)}+\Delta_j^{(wj)})$ as the error between the Euclidean distance and the distance in the probability space. Using $(\Delta_j^{(vj)}+\Delta_j^{(wj)})$ as a correction value, therefore, it becomes possible to accurately calculate the distance from the Euclidean space distance to the probability space. Compared with Formula 8. The definition of the distance of Formula 8 does not satisfy the conventional distance symmetry and triangle inequality, but the Formula 12 does satisfy all the distance scaling conditions including distance symmetry and triangle inequality was satisfied. Euclidean space and probability space solved the biggest problem for the unified distance. let $m_j^{(vj)}$ be $r_j$ to reach the number of probability regions involved by the multiple probability scale between the centers of $v_j$ probability distribution, for example, FIG. 5 is $m_j^{(wj)}=3$, then set $p_{ij}^{(530)}=p_{ij}^{(vj)}$, $(i=1, 2, \ldots, m_j^{(vj)})$, and $m_j^{(vj)}=3$, then set $p_{ij}^{(520)}=p_{ij}^{(wj)}$, $(i=1, 2, \ldots, m_j^{(vj)})$.

Similar to the above formula 8, when considering the probability measure of fuzzy event between $r_j \in R$ and the probability distribution (530) center value $v_j$ V, if $r_j \in R$ is in the region of the probability distribution of (530), And the probability distribution value of that region is $pf_j^{(vj)}$. Also, if $w_j \in W$ happens to be in the region of the probability distribution (530) by chance, the probability distribution value of that region is set as $ph_j^{(vj)}$. Due to the symmetry of the above probability, if $v_j \in V$ is also in the region of the 520 probability distribution, let the probability distribution value of that region be $ph_j^{(wj)}$. (It is assumed that the two probability distributions overlap each other in a special circumstance).

For arbitrary set R in a 500 $r_j \in R$ and 530 probability distribution center is a collection of fuzzy relation between $v_j$ of set V, by the $$F^{(v)} = \left\{ \sum_{j=1}^{n} \left[ 1 - \frac{(r_j - v_j)^2}{(w_j - v_j)^2} \right] \right\} \times 100 =$$
$$\left\{ \sum_{j=1}^{n} \left[ 1 - \frac{(v_j - r_j)^2}{(v_j - w_j)^2} \right] \right\} \times 100$$

(Formula 13)

$$(r_j - v_j) =$$
$$(v_j - r_j) = \begin{cases} 0 & |r_j - v_j| \le \beta^{(vj)}\Delta_j^{(vj)} \\ |r_j - v_j| - \beta^{(vj)}\Delta_j^{(vj)} & |r_j - v_j| > \beta^{(vj)}\Delta_j^{(vj)} \end{cases}$$

$$(w_j - v_j) = (v_j - w_j) =$$
$$\begin{cases} 0 & |w_j - v_j| \le \alpha(\Delta_j^{(wj)} + \Delta_j^{(vj)}) \\ |w_j - v_j| - \alpha(\Delta_j^{(wj)} + \Delta_j^{(vj)}) & |w_j - v_j| > \alpha(\Delta_j^{(wj)} + \Delta_j^{(vj)}) \end{cases}$$

Here, according to the formula 6, $$\Delta_j^{(wj)} = \sum_{i=1}^{m_j^{(wj)}} D_{ij}^{(wj)} P_{ij}^{(wj)}$$

$$\Delta_j^{(vj)} = \sum_{i=1}^{m_j^{(vj)}} D_{ij}^{(vj)} P_{ij}^{(vj)}$$

and, $$\beta^{(vj)} = (1 + pf_j^{(vj)})$$

$$\alpha = (1 + ph_j^{(vj)} + ph_j^{(wj)})$$

Here, in $r_j \in R$ to measure consider the probability distribution of the 530, $r_j \in R$ was in 530 in the probability distribution of the probability distribution value of $pf_j^{(vj)}$, similarly, $w_j \in W$ was in 530 in the probability distribution of the probability distribution value of $ph_j^{(vj)}$, (referring to the special circumstances of two probability distribution almost overlap).

With reference to formula 12 and formula 13, we can get a formula for a set R belonging to the set V: (Formula 14)

$$F^{(w)} = \left\{ \sum_{j=1}^{n} \left[ 1 - \frac{(r_j - w_j)^2}{(v_j - w_j)^2} \right] \right\} \times 100 = \left\{ \sum_{j=1}^{n} \left[ 1 - \frac{(w_j - r_j)^2}{(w_j - v_j)^2} \right] \right\} \times 100$$

$$(r_j - w_j) = (w_j - r_j) = \begin{cases} 0 & |r_j - w_j| \le \beta^{(wj)}\Delta_j^{(wj)} \\ |r_j - w_j| - \beta^{(wj)}\Delta_j^{(wj)} & |r_j - w_j| > \beta^{(wj)}\Delta_j^{(wj)} \end{cases}$$

$$(v_j - w_j) =$$
$$(w_j - v_j) = \begin{cases} 0 & |v_j - w_j| \le \alpha(\Delta_j^{(vj)} + \Delta_j^{(wj)}) \\ |v_j - w_j| - \alpha(\Delta_j^{(vj)} + \Delta_j^{(wj)}) & |v_j - w_j| > \alpha(\Delta_j^{(vj)} + \Delta_j^{(wj)}) \end{cases}$$

Here, according to the formula 6, $$\Delta_j^{(wj)} = \sum_{i=1}^{m_j^{(wj)}} D_{ij}^{(wj)} P_{ij}^{(wj)}$$

$$\Delta_j^{(vj)} = \sum_{i=1}^{m_j^{(vj)}} D_{ij}^{(vj)} P_{ij}^{(vj)}$$

and, $$\beta^{(wj)} = (1 + pf_j^{(wj)})$$

$$\alpha = (1 + ph_j^{(vj)} + ph_j^{(wj)})$$

Finally, by referring to the above-mentioned formula 11, by super deep competition learning of $F=(F^{(W)}/F^{(V)})$ by $F^{(W)}$ and $F^{(V)}$. For the arbitrary set R, it became possible to classify optimization between two data with probability distribution. Here, according to the formula 12, or formulas 13 and 14, including symmetry and triangle inequality in the distance scale condition, scale conditions for all distances were satisfied.

Here, we only take two probability distributions as an example to introduce the construction method of its super deep confrontation learning model. In practice, there are 3 probability distributions, and there are 4 ones. N probability distributions are optimally classified by super deep confrontation learning each other.

Figure 6:
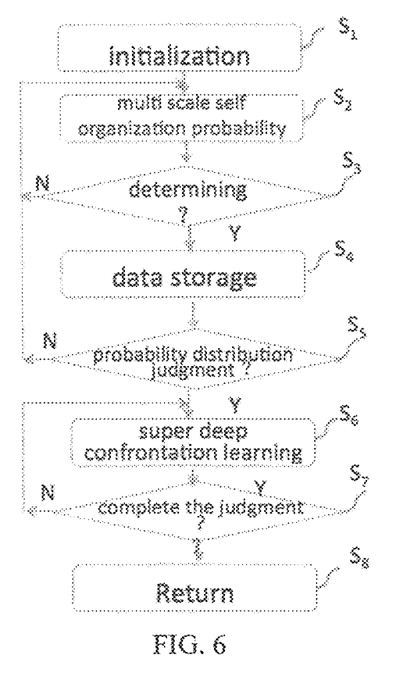
FIG. 6 is a best classification flow chart for super deep confrontation learning.

FIG. 6 is a best classification flow chart for super deep confrontation learning. As shown in FIG. 6, the following steps can be implemented with the following steps in combination with FIG. 5 for super depth confrontation learning.

$S_1$ is the initialization step, the contents of initialization of self-organization based on the probability scale are the same as the initialization step of $S_1$ in FIG. 2. First, set the number $m_j^{(wj)}$ and $m_j^{(vj)}$ of the scale of the multi-scale probability, for example, j $m_j^{(wj)}=m_j^{(vj)}=3$, In addition, we set the data registration space, Other necessary initialization processing contents are set up.

$S_2$ is a Step of self organization based on multi-probability scale step: Referring to step $S_2$ of the FIG. 2, set $w_{jh} \in W_h$ and $v_{jh} \in V_h$, (h=1, 2, . . . , g) using performing self-organization based on the multi-probability scale, gain calculate the scale value of the probability distribution and the center value of the maximum probability.

$S_3$ is the determining step multi probability scale $S_2$ self organization is complete? "No" to $S_2$ the "yes" to save the data in step $S_4$.

$S_4$ is the data storage step: according to the step of $S_2$, the values $w_{jh} \in W_h$ and $V_{jh} \in V_h$ of the maximum probability obtained in each element of $w_{jh} \in W_h$ and $V_{jh} \in V_h$, all the scale interval $D_{ij}^{(wj)}$ and $D_{ij}^{(vj)}$ values, and the probability distribution values $p_{ij}^{(wj)}$ and $p_{ij}^{(vj)}$ values in $D_{ij}^{(wj)}$ and $D_{ij}^{(vj)}$, and the number of graduations $m_j^{(wj)}$ and $m_j^{(vj)}$, and the probability values $pf_j^{(wj)}$ and values $ph_j^{(wj)}$ of $r_j \in R$ is in the probability space $w_j$ and $v_j$, all register to data base.

$S_5$ is a probability distribution judgment step. Is the machine learning completed by the multi-probability scale self-organized machine? "No." number PN=PN+1 probability distribution, jump to the $S_2$ probability scale self organization steps, "Yes" to the following $S_6$ super depth against learning steps.

$S_6$ is a super deep confrontation learning step: first, by formula 13 and formula 14 are used to calculate probability measure of fuzzy event, for $F^{(W)}$ and $F^{(V)}$, respectively, and we can get the result of confrontation learning as follows:

$$F=[F^{(W)}/F^{(V)}] \quad \text{(Formula 15)}$$

Or by formula 13-14

$$F = \left\{ \sum_{j=1}^{n} \left[ 1 - \frac{(r_j - w_j)^2}{(r_j - v_j)^2} \right] \right\} \times 100 = \quad \text{(Formula 16)}$$

$$\left\{ \sum_{j=1}^{n} \left[ 1 - \frac{(w_j - r_j)^2}{(v_j - r_j)^2} \right] \right\} \times 100$$

-continued $$(r_j - w_j) = (w_j - r_j) = \begin{cases} 0 & |r_j - w_j| \le (1 + pf_j^{(wj)})\Delta_j^{(wj)} \\ |r_j - w_j| - (1 + pf_j^{(wj)})\Delta_j^{(wj)} & |r_j - w_j| > (1 + pf_j^{(wj)})\Delta_j^{(wj)} \end{cases}$$

$$(r_j - v_j) = (v_j - r_j) = \begin{cases} 0 & |r_j - v_j| \le (1 + ph_j^{(wj)})\Delta_j^{(vj)} \\ |r_j - v_j| - (1 + ph_j^{(wj)})\Delta_j^{(vj)} & |r_j - v_j| > (1 + ph_j^{(wj)})\Delta_j^{(vj)} \end{cases}$$

Here, according to the formula 6, $$\Delta_j^{(vj)} = \sum_{i=1}^{m_j^{(vj)}} D_{ij}^{(vj)} P_{ij}^{(vj)}$$

and, $$\Delta_j^{(wj)} = \sum_{i=1}^{m_j^{(wj)}} D_{ij}^{(wj)} P_{ij}^{(wj)}$$

Here, if F≥0, $r_j \in R$ belong to the probability distribution of 520, or belong to another probability distribution 530.

$S_7$ is a Complete the judgment step: With the completion of the super deep competitive learning? "No", then to step 6 of super deep competitive learning, "Yes" shifts to step back next.

$S_8$ is a Return step: Back to the main program.

Figure 7:
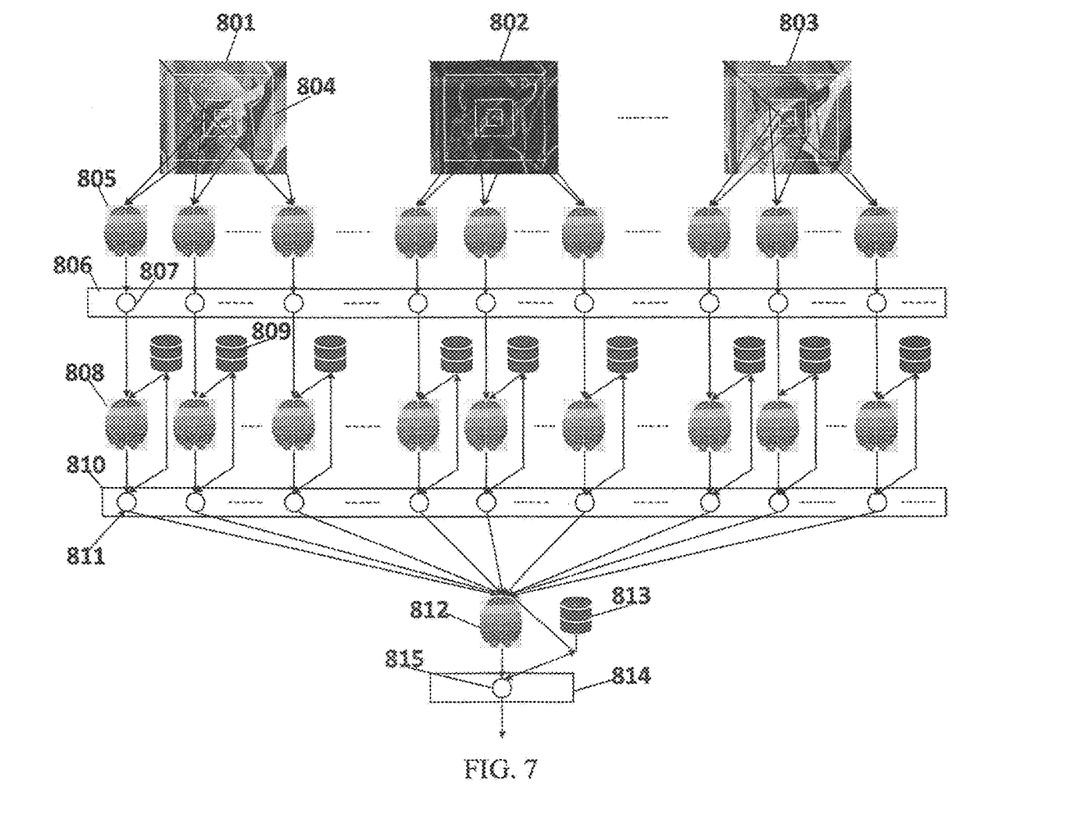
FIG. 7 is a schematic view of super deep confrontation learning neural.

FIG. 7 is a schematic view of super deep confrontation learning neural network. We describe the configuration of super deep competitive learning using image recognition as an example. As shown in FIG. 7, (801) indicates a spatial mapping of the target image to be sensed. The super deep competitive learning emphasizes extraction of image information. In order to maximize the accuracy of image recognition, spatial mapping of various images is performed on the original image targeted for recognition. For example, wave number space mapping of images, color space mapping of images, power space mapping of images, spatial mapping of edges of images and the like. 802 and 803 are examples of spatial mapping of two kinds of images, respectively.

804 is a local area of 801 images, mobile phone recognition can be considered here in an arbitrary angle of 360 degrees, can be correctly identified and set in accordance with the circular region segmentation method, the size of this area should be decided according to the need of the application range, although much more computing speed will soon. But the recognition accuracy will be affected. On the other hand, the range is too small, although the accuracy of recognition will be improved, but the speed of calculation will be slower. The number or area of pixels in each area can be considered, so that the amount of input can be more balanced.

(805) as a machine learning module of self-organization. These machine learning modules are connected between the object of recognition and each contact of the sensing layer. It has a function of deep layer excavation for target function information. It also has the feature of extracting the information of the target function as the maximum probability. It also has excellent features to track autonomously according to misregistration of the image that is the object of recognition. 806 as the sensing layer of the new neural network.

807 as the contact point of the sensing layer of the neural network. In the present invention, as a method for deepening the function of super deep competitive learning, as the information amount of the target function increases, the number of contacts of the sensing layer of the neural network also increases accordingly.

Machine learning of self-organization has features that autonomously track to the feature position of maximum probability. The problem of misalignment of images position can be improved when image recognition is performed. It is very important to have this feature, especially when recognizing video.

(808) is a machine learning module of connected self-organization between the sensing layer and the nerve layer. By mainly super-deep competitive learning, for the probability information input from the sensing layer, has deep excavation function. Furthermore, it is possible to obtain information on the probability distribution of the objective function. All the learned data is registered to 809 data base.

810 is the nerve layer of the neural network, and 811 is a node of the nerve layer of the neural network, and 814 is the cerebral cortex of the neuron network. Here, all of the probability distribution information obtained by the super deep competitive learning is transmitted from the nerve layer to the cerebral cortex.

812 is a super deep competitive machine learning module connected between the nerve layer 810 and the cerebral cortex 814 and decides the final decision mainly, the cerebral cortex layer 814 and its important function is as follows.

By using the above formula 12 to formula 16, the distance scale with the Euclidean space and the probability space unified, and the probability measure of fuzzy event, antagonism Super deep concurrence learning between a sample data and plurality of feature vector data of the registered probability distribution information, the processing effect is the optimization and the best use of distance information and fuzzy information, in the pattern recognition of vector of different contribution is an effect of optimized weighting.

Next, we can acquire the threshold of the neural layer based on the value of the maximum probability scale and the value of data competitive learning by super deep competitive learning, let this be the value of excitation of the nerve of the final brain cortex 814, The final recognition result can be obtained, this is a processing method to mimic the brain function.

Finally, for each registered feature vector data, machine learning of reliability using the feature vector data of maximum reliability determine the final recognition result.

Specifically, in the method of determining the reliability of the feature vector, for the j-th feature element of the feature vector of the k-th image already registered, Based on the actual recognition result, let $CD_{kj}$ be the success rate, assuming that the error recognition rate is $ED_{kj}$, the confidence value can be expressed by the following equation 17.

$$R_{kj} = \left(1 - \frac{ED_{kj}}{CD_{kj}}\right) 100 \quad (k = 1, 2, \ldots, z. \quad j = 1, 2, \ldots, e) \quad \text{(Formula 17)}$$

Next, in order to acquire the maximum probability reliability, and also for the reliability value of the feature element of each feature vector of each of the above images, mechanics learning of the maximum probability scale are performed and a measure of the maximum probability scale of use As the judgment criteria and selects a feature element having the maximum probability reliability and performs super deep learning only for the feature elements having the maximum probability reliability. As a result, it is possible to obtain the discrimination result of the maximum reliability.

Figure 8:
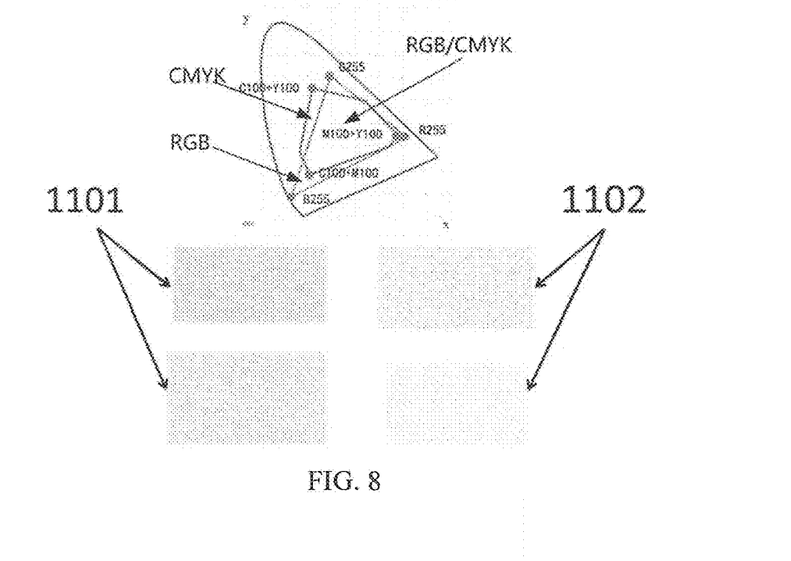
FIG. 8 is a flow chart of super deep confrontation learning against identification of forgery prevention by mobile phone.

FIG. 8 is a flow chart of super deep confrontation learning against identification of forgery prevention by mobile phone.

FIG. 8 shows super deep competitive learning in identification of anti-counterfeiting in mobile phone. As shown in FIG. 8, In which the print color is a color space composed of CMYK and the electronic image color is a color space composed of RGB However, the two color spaces of the electronic image and the printed image almost overlap each other, there is are also parts that do not coincide. If the color of the original image is 1101 and the scanned image is 1102 having such characteristics, as shown in FIG. 8, if the print image is scanned, the original image cannot be completely restored.

However, it is possible to make the printed image copied by the scan closer to the original printed image by some modification methods. In particular, it is difficult to distinguish the original image clearly by the naked eye or a conventional optical discriminator, which is the copied image and which is the original image, this is difficult to solve in the present whole society It is a matter of prevention of forgery of goods.

A specific method is to identify a plurality of original print images on a print line by using an optical discriminator or to shoot a plurality of original print images under different circumstances by a mobile phone, probability information of the feature vector of the original printed image is obtained using machine learning of the probability scale. Herein, the probability information includes the value of the probability distribution, the value of the probability scale, and the maximum probability value of each feature element.

By super deep confrontation learning of the original image, consumers can use their mobile phones to distinguish the original images and forge images, and a high-precision anti-counterfeit recognition code that distinguishes between the original and the replicated images can be obtained.

Figure 9:
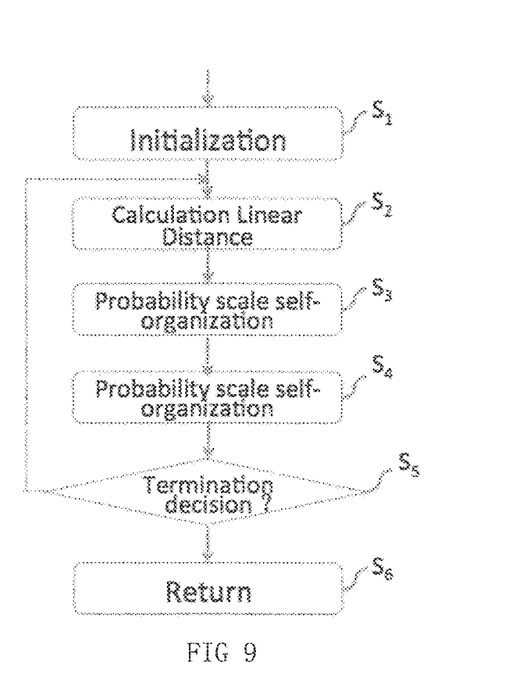
FIG. 9 is a Flow chart of the super deep regression analysis learning.

FIG. 9 is a Flow chart of the super deep regression analysis learning. As shown in FIG. 9, the processing flow of the super deep regression analysis learning has the following six steps:

Initialization Step $S_1$: First, the target data of the super deep regression analysis learning is divided into elements $(x_j^{(i)}, y_j^{(i)}) \in RD^{(i)}$ (i=0, 1, ..., Nm−1; j=1, 2, ..., m), and let the data density be $D_{ns}^{(i)}$. Let (i) be the number of super deep regression analysis learning, and let $N_{max}$ be the super deep regression analysis learning maximum number. The initial values are $(x_j^{(i)}, y_j^{(i)}) \in RD^{(i)}$, $D_{ns}^{(i)}$, processing effect judgment value $V_{eff}$, initial region $a^{(0)}$.

Calculation Linear Distance Step $S_2$: For the data $(x_j^{(i)}, y_j^{(i)}) \in RD^{(i)}$ in the region $a^{(i)}$, the calculation of the regression line for the regression analysis is as follows:

$$y^{(i)\prime} = \frac{1}{m}\sum_{j=1}^{m} y_j^{(i)} \quad \text{(Formula 18)}$$

$$x^{(i)\prime} = \frac{1}{m}\sum_{j=1}^{m} x_j^{(i)} \quad \text{(Formula 19)}$$

$$b^{(i)} = \frac{\sum_{j=1}^{n}(y_j^i - y^{(i)\prime})x_j^{(i)}}{\sum_{j=1}^{n}(x_j^i - x^{(i)\prime})x_j^{(i)}} \quad \text{(Formula 20)}$$

-continued $$a^{(i)} = y^{(i)\prime} - b^{(i)}x^{(i)\prime} \quad \text{(Formula 21)}$$

$$y^{(i)} = a^{(i)} + b^{(i)}x^{(i)} \quad \text{(Formula 22)}$$

Here, with respect to the i th self-organization process, let $y_j^{(i)\prime}$ be the average value of $y_j^{(i)}$, $x^{(i)\prime}$ be the mean value of $x_j^{(i)}$, $b^{(i)}$ is a slope linear regression, And the distance from the jth dot $(x^{(i)}, y_j^{(i)}) \in RD^{(i)}$ to the linear regression line is as follows.

$$d_j^{(i)} = \frac{b^{(i)}x_j^{(i)} - y_j^{(i)} + a_j^{(i)}}{\sqrt{b^{(i)2} + 1}} \quad \text{(Formula 23)}$$

Probability scale self-organization step $S_3$: As shown in FIG. 1 and FIG. 2, it is a using the self-organization of probability scale. Let $d_j^{(i)}$ (j=1, 2, ..., m; i=0, 1, ..., ) be the distance from $RD^{(i)}$ to the linear regression line distance, after doing its self-organization of probability scale with $d_j^{(i)}$.

Get a new range step $S_3$: Hold data within the probability scale and remove data other than the probability scale, a new region $a^{(i+1)}$ and new set $RD^{(i+1)}$ was generated.

Termination decision step $S_5$: If the following conditions are met, the process is completed. $i \geq N_{max}$, or $|M^{(i+1)} - M^{(i)}| \leq V_{eff}$, or $|D_{ns}^{(i+1)} - D_{ns}^{(i)}| \leq V_{eff}$. and $$M^{(i)} = \begin{cases} M^{(i+1)} & (D_{ns}^{(i+1)} - D_{ns}^{(i)}) > 0 \\ M^{(i)} & (D_{ns}^{(i+1)} - D_{ns}^{(i)}) = 0 \\ M^{(i-1)} & (D_{ns}^{(i+1)} - D_{ns}^{(i)}) < 0 \end{cases} \quad \text{(Formula 24)}$$

According to the above equation, if it becomes "N", it moves to $S_2$, otherwise it becomes "Y", the next step $S_6$ is entered.

Return step $S_6$: The super deep regression analysis learning is completed to return to the main program.

In the neural network of the super deep layer learning, each of the important parts of the system has a special function of carrying out distributed processing by machine learning respectively. It can be applied to industrial AI such as automatic driving. Also, a new automatic control system can be expected. Furthermore, since the contact points between the sensing layer and the nerve layer can infinitely increase, the performance of machine learning can be infinitely high accordingly. It can be small for the hard environment or large, depending on the application, it can be selected. Due to this feature, application of the AI system to all industrial fields becomes possible too much.

What is claimed is:

1. A constructing method for constructing a neural network model of super deep competitive learning by performing data countermeasuring, the constructing method comprising the steps of:

providing a Euclidean space model of a data set;
providing a probability space model of the data set;
correcting an error value between a value of the Euclidean distance from the Euclidean space model and a value of an actual distance of probability space from the probability space model; and
unifying the Euclidean space model and the probability space model in response to the correcting of the error value by performing at least one of:
generating at least one corrected distance between the Euclidean space model and the probability space model,
generating a fuzzy event probability measure, and generating a probability scale.

2. A constructing method for a neural network model of super deep competitive learning by performing data countermeasuring, according to claim 1, wherein the neural network model includes at least a nerve layer, a sensing layer and cerebral cortex, further comprising the steps of:

performing self-organization learning through at least one of connecting between an object of recognition and at least one node of the sensing layer, connecting via machine learning between at least one node of the sensing layer and one node of the nerve layer, and transmitting probability distribution information from the nerve layer to the cerebral cortex.

* * * * *